United States Patent [19]
Rieger

[11] Patent Number: 5,081,361
[45] Date of Patent: Jan. 14, 1992

[54] PASSIVE ATOMIC RESONANCE FILTER

[75] Inventor: Harry Rieger, San Diego, Calif.

[73] Assignee: Sparta, Inc., San Diego, Calif.

[21] Appl. No.: 584,682

[22] Filed: Sep. 19, 1990

[51] Int. Cl.$^5$ .............................................. G02B 5/20
[52] U.S. Cl. .............................. 250/458.1; 250/336.1;
  250/338.1; 250/361 C; 250/459.1
[58] Field of Search .................. 250/338.1, 336.1, 353,
  250/458.1, 459.1, 361 C, 352; 455/617; 350/166

[56] References Cited

U.S. PATENT DOCUMENTS

| | | | |
|---|---|---|---|
| 1,542,937 | 6/1925 | Hammond, Jr. | 250/353 |
| 4,292,526 | 9/1981 | Marling | 250/458.1 |
| 4,829,597 | 5/1989 | Gelbwachs | 455/617 |
| 4,986,655 | 1/1991 | Sweeney et al. | 356/73 |
| 4,995,101 | 2/1991 | Titterton et al. | 455/617 X |

*Primary Examiner*—Constantine Hannaher
*Assistant Examiner*—Edward J. Glick
*Attorney, Agent, or Firm*—Frank D. Gilliam

[57] ABSTRACT

An atomic resonance filter device. The device includes a bulbous shaped cell containing atomic vapor which converts narrow band received light into longer wavelength photons which are collected by an integrated sphere like housing and a spatial collecting cone to which passes the longer wavelength photons to a photodector. The housing has an inner reflective surface or coating which reflects received light and converted light frequencies. The housing opening is covered with a filter that passes the received light and blocks the spectrum of converted light. The inner surface of the filter is coated with a coating highly reflective to converted light. A light collecting cone with a cylindrical body portion is centrally positioned in the bottom of the cesium cell on the surface of the housing opposite the housing opening and the cylindrical portion passes through the wall of the housing to the exterior. Collecting cone improves light collection to the photodetector by about 50%. A filter that passes the converted light and reflects the received light is positioned between the output end of the light collecting cone exterior of the housing and a photodetector tube so that only converted light is received by the photodetector. The photodetector produces electrical signals related to information carried by the received light frequency.

15 Claims, 1 Drawing Sheet

PASSIVE ATOMIC RESONANCE FILTER

BACKGROUND OF THE INVENTION

The invention is directed to an atomic resonance filter for optical receivers operating in the presence of solar background radiation, and are not limited in their field of view (FOV).

Filters of this type are used, as for example and not by limitation, for communications from a first location such as, for example, an airplane or satellite to a second location such as, for example a submarine.

The present state of the art atomic resonance filter used in this manner is a filter pack generally referred to as a pancake filter assembly. As can be seen in the prior art showing in drawing FIG. 1, a prior art filter A is depicted. A central positioned cesium cell B is covered at each open end surface by a first sapphire window C and a second sapphire window D. A heater element E surrounds the outer surface of the cesium cell C for elevating the temperature of the cesium cell at its center to approximately 100 degrees C. by heat transfer through the sapphire windows. The first sapphire window C is covered with a light receiving blue filter F for passing only blue light and the second sapphire window D is covered by an infra-red filter G for passing only infra-red light. A plurality of photo-multiplier tubes H in a number sufficient to substantially cover the light emitting surface of the infra-red filter G, nine are shown. More or less than nine may be used depending on the surface area of the infra-red filter. The output signals from the photo-multiplier tubes are parallel fed to provide an output signal related to communication information carried by the blue light.

In operation, only blue light is passed through the blue light filter F into the cesium cell. The received blue light signal contains communication information and is void of any other light frequency. The blue light signal passes through the first sapphire window and into the heated cesium cell which produces infra-red photons therefrom. The infra-red photons pass through the second sapphire window, infra-red filter, are received by the plurality of photo multiplier tubes and converted to usable electric signals from which the communication information carried by the blue light is extracted.

The typical prior art atomic resonance filter has several undesirable characteristics, namely, they require a large bulky cesium cell; large expensive sapphire windows; they are inefficient as they miss pulses generated by the Titanium fluorescence in the sapphire windows and have no enhanced infra-red light collection; they require high temperatures and high power for operation; a plurality of photo-multiplier tubes are required and because of the large infra-red signal receiving area avalanche photo diodes cannot be utilized for infra-red light to electrical signal conversion; and in addition, the devices are complex, economically costly and require a large volume of space for implementation.

There has not been a simple, inexpensive, compact and improved efficient atomic resonance filter until the emergence of the president invention.

SUMMARY OF THE INVENTION

The present invention is an atomic resonance filter device with a large blue light receiving surface which concentrates this wide area of received blue light into a narrow beam of infra-red light.

The device is formed as a semi-bulbous open bowl like light impervious housing. The inner surface of the housing is coated with a reflective medium which reflects both infra-red and blue light frequencies. The open surface of the housing is covered with a blue filter which passes blue light frequencies and substantially rejects other light frequencies. The inner surface of the blue filter is coated with an Infra-red reflective material. This infra-red reflective material allows the blue frequency light to readily pass through the blue filter reflective coating and reject the reverse passing of the infra-red light generated within the housing. Centrally positioned in the bottom of the housing opposite the opening is a light collecting cone with the cone angled surfaces having an angle in the range of 80 to 110 degrees. The cone extends in tubular form through the housing to the exterior thereof. Positioned between the bottom central inner surface of the housing and the blue filter is a cesium cell having a generally bulbous shape. The outer wall of the cesium cell is transparent at least to blue and infra-red light frequencies. A heater element either positioned around the cell or around the outer surface of the housing is used to heat the cesium cell to a temperature of about 100 degrees C. to provide adequate atomic vapor to convert the incoming blue light frequency into infra-red light frequency photons. An Infra-red filter is positioned at the exterior end of the tubular portion of the infra-red light receiving cone. A single photodetector is positioned on the outer side of the infra-red filter. Infra-red light frequencies are converted by the photodetector into electrical signals representative of the information carried by the blue light. It should be understood that a single avalanche photo diode could be used in place of the photodetector to practice the invention.

In operation the blue light enters the blue filter and is directed toward the inner walls of the housing which are designed to redirect the reflected blue light through or into the cesium cell where the blue light is converted into infra-red protons and collected by the angled surface of the light receiving cone. The focal point of the reflected light from the housing is the light collecting cone. The cone is constructed of PYREX glass or the like which collimates the collected infra-red protons through the infra-red filter into a single photodetector. Because of the combined configuration of the inner surface of the housing and the angle of the light collecting surfaces of the cone substantially most of the received blue light and the carried communication information is converted and captured by the single photodetector.

The present invention discloses an atomic resonance filter that is much improved over the known art, namely, the filter concentrates the light from a large aperture onto a small volume cesium cell, requires only a small photodetector, has an improved signal to noise ratio, has lower power consumption and is simpler and economically inexpensive to fabricate.

An object of this invention is to provide an atomic resonance filter that has increased efficiency as compared to the state of the art atomic resonance filters.

Another object of this invention is to provide an atomic resonance filter that does not require any expensive sapphire windows.

Another object of this invention is to provide an atomic resonance filter which is not effected by the problems commonly associated with sapphire filters.

Still another object of this invention is to operate the cesium cell to a lower temperature and hence at a lower economic operating cost.

Yet another object of this invention is to provide enhanced infra-red photon collection across a smaller surface area.

Yet another object of this invention is to provide a centrally positioned conic infra-red photon collection surface.

A further object of this invention is to provide a infra-red photon collection area suitable for the use of a avalanche photo diode for the infra-red to electrical information conversion.

A yet further object of this invention is to provide an atomic resonance filter that is simple to construct, is economically inexpensive and is compact in physical size.

Other objects and features of the invention will become apparent as the drawings which follow are understood by reading the corresponding description thereof.

BRIEF DESCRIPTION OF THE DRAWING FIGURES

FIG. 1 depicts a perspective showing in partial cutaway showing of a common state of the art pancake atomic resonance filter and FIG. 2 depicts a perspective showing in partial cutaway of the atomic resonance filter of the present invention.

DETAILED DESCRIPTION OF THE PREFERRED EMBODIMENT

Figure 1:
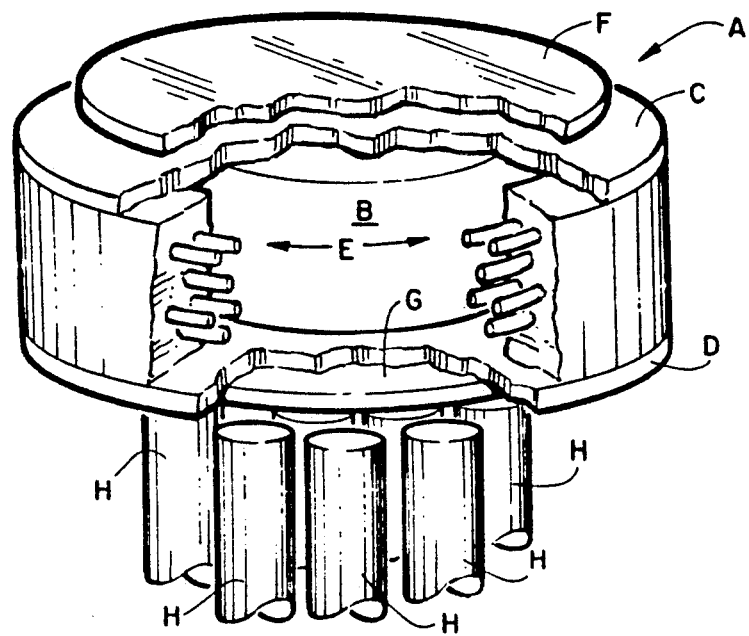

Referring now to the prior art showing of drawing FIG. 1, a prior art filter A is depicted. A central positioned cesium cell B is covered at each open end surface by a first sapphire window C and a second sapphire window D. A heater element E surrounds the outer surface of the cesium cell C for elevating the temperature of the cesium cell at its center to approximately 100 degrees C. by heat transfer through the sapphire windows. The first sapphire window C is covered with a light receiving blue filter F for passing only blue light and the second sapphire window D is covered by an infra-red filter G for passing only infra-red light. A plurality of photo-multiplier tubes H in a number sufficient to substantially cover the light emitting surface of the infra-red filter G, nine are shown. More or less than nine may be used depending on the surface area of the infra-red filter. The output signals from the photo-multiplier tubes are parallel fed to provide an output signal related to communication information carried by the blue light.

In operation, only blue light is passed through the blue light filter F into the cesium cell. The received blue light signal contains communication information and is void of any other light frequency. The blue light signal passes through the first sapphire window and into the heated cesium cell which produces infra-red photons therefrom. The infra-red photons pass through the second sapphire window, infra-red filter, are received by the plurality of photo multiplier tubes and converted to usable electric signals from which the communication information carried by the blue light is extracted.

Figure 2:
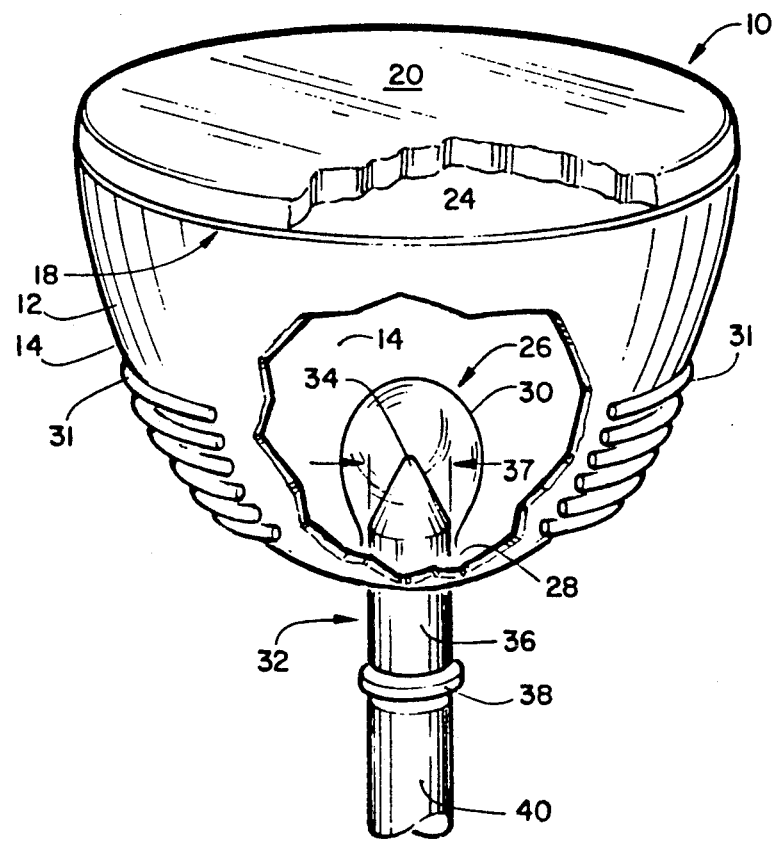

Referring now specifically to drawing FIG. 2 which depicts in partial cutaway perspective showing of the atomic resonance filter 10 of the present invention. The body 12 of the filter is coated with a light reflective surface 14, shaped in a semi-bulbous or bowl configuration for directing reflected light therefrom toward a centrally positioned collector. The reflective surface comprises a layer of silver. The inner surface of the body is coated with a reflective material 14 such as silver that reflects both blue and infra-red light frequencies. The light filter may be constructed of metal, glass, plastic or the like. The wide end of the body 12 is open at 18. The opening 18 is covered with a blue light filter 20. The inner surface is coated with a reflective surface 24 previous to blue light frequencies and impervious to infra-red light frequencies.

A cesium cell 26 is centrally located in the surface of body portion 28 located opposite the light filter 20. The cesium cell 26 has a bulbous shaped wall 30 which is transparent to both blue and infra-red light frequencies. The cesium cell is externally heated by a heater 31 located around the body 12 as shown or may be located closely adjacent to the cell as desired. Centrally positioned in the bottom of the cesium cell 26 and extending exterior of the body portion 12 is a light collecting and guiding element 32. The upper surface 34 of the element 32 is conic shaped and the lower portion 36 is cylindrical. The cone shaped portion has a surface included angle 37 in the range of 70 to 110 degrees. The exact angle of the conic surface is determined by the index of refraction of the material and the angle of the cone must cooperate to insure that substantially all of the light reflected from the walls of the body is directed to the angled surface of the cone. The collected light from the cone is directed through the cylindrical portion 36 where the collected light passes through an infra-red filter 38 which passes only the infra-red light.

The infra-red light passing through the infra-red filter 38 is detected by a photodetector 40 or an equivalent light signal to electrical signal conversion is made whereby the electrical signal substantially re-establishes the communication signal carried by the blue light received by the atomic resonance filter of the present invention.

It should be understood that the various components can be made from any material suitable for practicing the invention as discussed above and that communications between locations on earth, underwater, air and space or otherwise can be performed with the resonance filter of the invention.

While a specific embodiment the atomic resonance filter has been shown and fully explained above using cesium vapor for the purpose of illustration it should be understood that many alterations, modifications and substitutions may be made to the instant invention disclosure without departing from the spirit and scope of the invention as defined by the appended claims.

What is claimed is:

1. An atomic resonance filter comprising:
   an open bowl like housing body the inner surface of which re-directs substantially all of the light impinging thereon to a central location;
   a selected light frequency filter covering the opening of the bowl like body, said filter having the surface within said bowl including a reflective coating transparent to a first selected frequency and reflective to at a second selected frequency;
   a cesium cell centrally located adjacent to the inner bottom surface of said bowl like housing body;
   heater means for elevating the temperature of said cesium cell;
   a light collecting element with a light collecting end surface extending from exterior of said bowl like housing into said cesium cell, said light collecting end positioned at said central location; and converting means for converting the light collected by said light collecting element into electrical signals representative thereof.

2. The atomic resonance filter as defined in claim 1 wherein said open bowl like housing body is constructed of metal.

3. The atomic resonance filter as defined in claim 1 wherein said selected light frequency filter is constructed of glass.

4. The atomic resonance filter as defined in claim 1 wherein said selected light frequency filter is constructed of plastic.

5. The atomic resonance filter as defined in claim 1 wherein said heater means is positioned around the outer surface of said bowl like housing.

6. The atomic resonance filter as defined in claim 1 wherein said light collecting end surface includes a conic configured light collecting surface positioned at said central location.

7. The light collecting end surface as defined in claim 6 wherein the included angle of said conic configured light collecting surface is in the range of 70 to 110 degrees.

8. The atomic resonance filter as defined in claim 1 wherein said cesium cell has an outer enclosure wall transparent to at least said first and second selected frequencies.

9. The atomic resonance filter as defined in claim 1 wherein said converting means is a single photodetector.

10. The atomic resonance filter as defined in claim 1 wherein said converting means is an avalanche photo diode.

11. The atomic resonance filter as defined in claim 1 wherein said light collecting element collimates substantially all of the light of said first and second selected frequencies.

12. The atomic resonance filter as defined in claim 1 wherein said converting means includes a filter for passing only said second selected frequency to said converting means.

13. The atomic resonance filter as defined in claim 1 wherein said first light frequency is the frequency of blue light.

14. The atomic resonance filter as defined in claim 1 wherein said second light frequency is the frequency of infra-red light.

15. A method of converting a first light signal frequency to a second light signal frequency and converting said second light frequency signal into a corresponding electrical signal representative of said first light signal frequency comprising the steps of:

passing said first light signal frequency through a first light filter which is transparent thereto;

coating one surface of said first light filter with a material reflective to said second light frequency signal and transparent to said first light frequency signal;

providing a bowl like housing the open surface of which is enclosed by said first light filter, said bowl like housing configured to reflect all light frequencies impinging thereon to a central location therein;

providing a light collecting means having a cesium cell for converting said first light frequency to said second light signal frequency at said central location and heating said cesium cell to a predetermined temperature to cause said converting;

filtering the light collected by said light collecting means through a second light filter for substantially removing all of said first light signal frequency while passing substantially all of said second signal light frequency; and converting said second signal light frequency passing through said second light filter into electrical signals representative of said first light signal frequency.

* * * * *